US012676663B2

(12) United States Patent
Yang et al.

(10) Patent No.: US 12,676,663 B2
(45) Date of Patent: Jul. 7, 2026

(54) WIRELESS AUXILIARY DEVICE

(71) Applicant: VIVO MOBILE COMMUNICATION CO., LTD., Dongguan (CN)

(72) Inventors: Kun Yang, Dongguan (CN); Dajie Jiang, Dongguan (CN); Xusheng Wei, Dongguan (CN); Xian Cui, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 553 days.

(21) Appl. No.: 18/144,946

(22) Filed: May 9, 2023

(65) Prior Publication Data

US 2023/0275647 A1 Aug. 31, 2023

Related U.S. Application Data

(63) Continuation of application No. PCT/CN2021/129298, filed on Nov. 8, 2021.

(30) Foreign Application Priority Data

Nov. 10, 2020 (CN) .......................... 202011248809.8

(51) Int. Cl.
*H04B 7/155* (2006.01)

(52) U.S. Cl.
CPC ................................ *H04B 7/15507* (2013.01)

(58) Field of Classification Search
CPC . H04B 7/14; H04B 7/145; H04B 7/15; H04B 7/15507; H04B 7/15514; H04B 7/15528
See application file for complete search history.

(56) References Cited

U.S. PATENT DOCUMENTS 8,699,943 B2 4/2014 Kummetz et al.
10,623,083 B2 4/2020 Liang et al.
(Continued)

FOREIGN PATENT DOCUMENTS

CN 1463561 A 12/2003
CN 102811085 A 12/2012
(Continued)

OTHER PUBLICATIONS

WO 2013184047 A1), Finne, Resource Allocation Method Implemented In Base Station Node of Long Term Evolution System, Involves Detecting Transmission Through Repeater, and Performing Frequency Selective Scheduling of Wireless Device Only on Sub-band of Repeater, Dec. 2013, pp. 1-30 (Year: 2013).*

*Primary Examiner* — Keith Ferguson
(74) *Attorney, Agent, or Firm* — The Webb Law Firm

(57) ABSTRACT

A wireless auxiliary device includes a signal operation module and a filtering module. An electromagnetic characteristic of the signal operation module is adjustable, and an electromagnetic response characteristic of a signal on an operating frequency band is controlled by adjusting the electromagnetic characteristic of the signal operation module. The filtering module is configured to enable an electromagnetic response characteristic of the wireless auxiliary device on a signal on a non-operating frequency band not to be controlled by the signal operation module. The signal on the operating frequency band and the signal on the non-operating frequency band are radio signals transmitted by a base station or a terminal.

17 Claims, 3 Drawing Sheets

(56)        References Cited

U.S. PATENT DOCUMENTS

| | | | |
|---|---|---|---|
| 11,218,199 | B2 | 1/2022 | Chen et al. |
| 2005/0227619 | A1 | 10/2005 | Lee et al. |
| 2008/0267112 | A1* | 10/2008 | Lucidarme ........... H04B 7/1555 |
| | | | 370/315 |
| 2010/0177668 | A1* | 7/2010 | Ahn ................... H04B 7/15585 |
| | | | 370/279 |
| 2013/0012190 | A1 | 1/2013 | Pergal |
| 2013/0149957 | A1 | 6/2013 | Declos et al. |
| 2016/0198347 | A1* | 7/2016 | Zhan ................. H04B 7/15528 |
| | | | 455/23 |
| 2019/0052346 | A1 | 2/2019 | Yu |
| 2020/0084013 | A1* | 3/2020 | Ashworth ................. H04L 5/14 |
| 2020/0336168 | A1 | 10/2020 | Hormis et al. |
| 2021/0037447 | A1* | 2/2021 | Tarighat Mehrabani .................... |
| | | | H04W 40/248 |

FOREIGN PATENT DOCUMENTS

| | | | |
|---|---|---|---|
| CN | 207442845 | U | 6/2018 |
| CN | 109905150 | A | 6/2019 |
| CN | 110336575 | A | 10/2019 |
| CN | 110855589 | A | 2/2020 |
| CN | 111050277 | A | 4/2020 |
| CN | 111355520 | A | 6/2020 |
| KR | 101408306 | B1 | 6/2014 |
| WO | 2020254031 | A | 12/2020 |

* cited by examiner

WIRELESS AUXILIARY DEVICE

CROSS-REFERENCE TO RELATED APPLICATIONS

This application is a Bypass Continuation Application of PCT/CN2021/129298 filed Nov. 8, 2021, and claims priority to Chinese Patent Application No. 202011248809.8 filed Nov. 10, 2020, the disclosures of which are hereby incorporated by reference in their entireties.

BACKGROUND OF THE INVENTION

Field of the Invention

This application pertains to the field of communications technologies, and specifically relates to a wireless auxiliary device.

Description of Related Art

Shields in a coverage area of a cell usually cause a coverage hole, wireless signals have relatively weak strength in a coverage hole area, and communication quality is affected. This phenomenon is more common on a high frequency band/millimeter band.

SUMMARY OF THE INVENTION

A wireless auxiliary device includes a signal operation module and a filtering module. An electromagnetic characteristic of the signal operation module is adjustable, and an electromagnetic response characteristic of a signal on an operating frequency band is controlled by adjusting the electromagnetic characteristic of the signal operation module. The filtering module is configured to enable an electromagnetic response characteristic of the wireless auxiliary device on a signal on a non-operating frequency band not to be controlled by the signal operation module. The signal on the operating frequency band and the signal on the non-operating frequency band are radio signals transmitted by a base station or a terminal.

BRIEF DESCRIPTION OF THE DRAWINGS

The foregoing and/or additional aspects and advantages of this application will become apparent and readily understood from the description of the embodiments with reference to the following accompanying drawings, in which.

DESCRIPTION OF THE INVENTION

Figure 1:
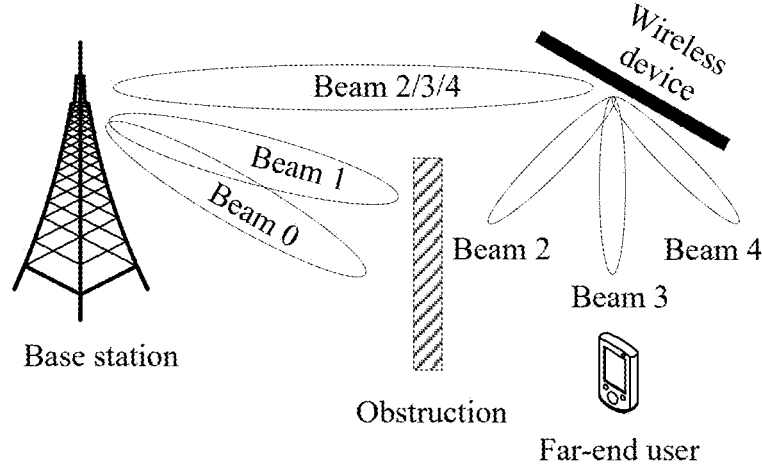
FIG. 1 is a schematic diagram of an application scenario of a wireless auxiliary device.

The following describes in detail embodiments of the present application, examples of which are shown in the accompanying drawings, where identical or similar reference numerals represent identical or similar elements or elements having identical or similar functions. The following embodiments described with reference to the accompanying drawings are exemplary and are intended to explain this application only, but cannot be construed as a limitation on this application. Based on the embodiments of this application, all other embodiments obtained by a person of ordinary skill in the art shall fall within the protection scope of this application.

Features of terms "first" and "second" in the specification and claims of this application may explicitly or implicitly include one or more such features. In the descriptions of this application, unless otherwise stated, "multiple" means two or more. In addition, in the specification and the claims, "and/or" represents at least one of connected objects, and the character "/" generally represents an "or" relationship between associated objects.

In the descriptions of this application, locations or location relationships indicated by terms "center", "longitudinal", "transverse", "length", "width", "thickness", "up", "down", "in front of", "behind", "left", "right", "vertical", "horizontal", "top", "bottom", "inside", "outside", "clockwise", "counterclockwise", "axial", "radial", "circumferential", and the like are based on locations or location relationships shown in the accompanying drawings, and are merely intended for ease of describing this application and simplifying descriptions, instead of indicating or implying that an indicated apparatus or component needs to be provided on a specific location or constructed and operated on a specific location, and therefore shall not be understood as limitations on this application.

In descriptions of this application, it should be further noted that, unless otherwise specified and limited, terms "mount", "connect", and "connection" should be understood in a broad sense, for example, may be a fixed connection, a detachable connection, or an integral connection, may be a mechanical connection or an electrical connection, or may be a direct connection, an indirect connection established by using an intermediate medium, or a connection inside two components. A person of ordinary skill in the art may understand specific meanings of the foregoing terms in this application in a specific case.

To improve communication quality, some wireless auxiliary devices (such as an intelligent surface) are generally introduced currently. The wireless auxiliary devices provide a communication service for a coverage hole area by forwarding/reflecting a signal of a base station/terminal. Through reasonable deployment, the foregoing wireless auxiliary device can ensure good signal coverage. As shown in FIG. 1, a wireless auxiliary device in FIG. 1 provides a communication service for a user in a coverage hole area by reflecting a signal of a base station.

However, currently, when a wireless auxiliary device implements precise control on a signal on an operating frequency band, a signal on a non-operating frequency band may be affected. This characteristic of the wireless auxiliary device affects operating performance of another communication system on a neighboring frequency band.

An embodiment of this application provides a wireless auxiliary device. By receiving a signal from an operating frequency band of a base station or a terminal, and forwarding the signal on the operating frequency band according to a parameter required by a communication system, an auxiliary base station provides a service for a terminal in a coverage hole area, and a problem that a wireless auxiliary device in a related technology affects a signal on a non-operating frequency band can be resolved by introducing a frequency selected module (filtering module).

Each embodiment of this application provides a wireless auxiliary device, which is characterized by involuntary generation of a wireless signal. The wireless auxiliary device may receive a wireless signal from a base station or a terminal, and then forward the received wireless signal according to an electromagnetic response parameter that is configured in advance. An implementation of the wireless auxiliary device may be based on a super-material reflective reconfigurable intelligent surface, a transmissive reconfigurable intelligent surface, a repeater with multiple antennas, or the like.

Figure 2:
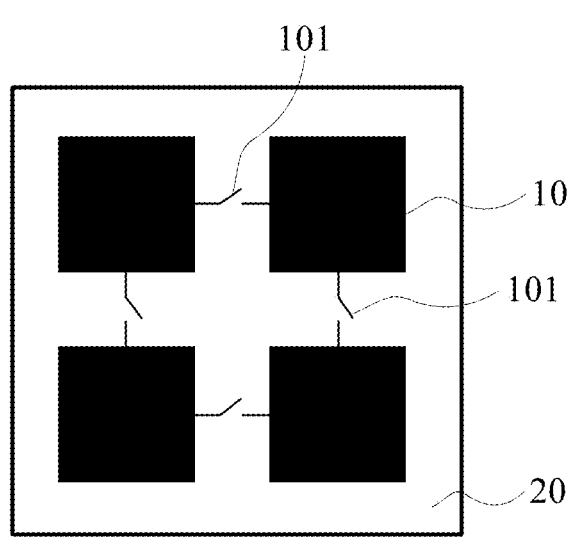
FIG. 2 is a schematic diagram of a partial structure of a wireless auxiliary device according to an embodiment of this application.
Figure 3:
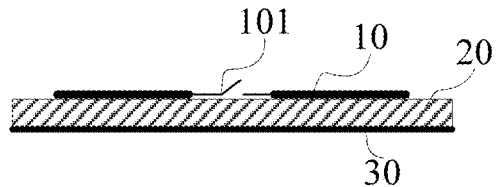
FIG. 3 is a schematic diagram of a wireless auxiliary device shown in FIG. 2.

As shown in FIG. 2 and FIG. 3, an embodiment of this application provides a wireless auxiliary device, which mainly includes a signal operation module 10, a filtering module (not marked or shown), a medium layer 20, and a bottom plate 30.

In this embodiment, the bottom plate 30 is adhered to a first side (a lower side in FIG. 3) of the medium layer 20, and the signal operation module 10 is adhered to a second side (an upper side in FIG. 3) of the medium layer 20. The bottom plate 30 is generally a continuous metal surface. For a reflective wireless auxiliary device, the bottom plate 30 is configured to ensure good signal reflection efficiency. The medium layer 20 is located on the bottom plate 30, and generally ensures an insulation characteristic. Actually, the medium layer 20 and the bottom plate 30 may also be designed into an integrated structure. The medium layer 20 and the bottom plate 30 are optional structures, and may be omitted or deformed based on a specific implementation principle of the wireless auxiliary device.

There are generally multiple signal operation modules 10 (four shown in FIG. 2), and the multiple signal operation modules 10 are disposed in an array on a surface of the medium layer 20.

For example, as shown in FIG. 2 and FIG. 3, four signal operation modules 10 in FIG. 2 are in one group, and the four signal operation modules 10 are disposed in (rows and columns) arrays on the surface of the medium layer 20. In actual application, multiple groups of signal operation modules 10 may be disposed in a row-column array on the surface of the medium layer 20 according to a requirement such as an area of the wireless auxiliary device. Through the foregoing unified structure design, a unified processing manner is ensured, manufacturing complexity is reduced, and costs are reduced. It should be understood that the signal operation module 10 provided in the figure is a special example of implementation of the module. There may be different patterns according to different operation principles and different targets.

In this embodiment, an electromagnetic characteristic of the signal operation module 10 is adjustable. Through adjustment of the electromagnetic characteristic of the signal operation module 10, an electromagnetic response characteristic of a signal on an operating frequency band can be controlled, for example, at least one of the following: a phase, an amplitude, or a polarization direction of the signal on the operating frequency band is controlled. In other words, electromagnetic response characteristics of the signal on the operating frequency band that the wireless auxiliary device provided in this embodiment is configured to control include at least one of the following: a phase, an amplitude, or a polarization direction.

The signal on the operating frequency band and the signal on the non-operating frequency band mentioned in this embodiment of the present specification may be radio signals transmitted by a base station or a terminal.

The filtering module in this embodiment is configured to enable an electromagnetic response characteristic of the wireless auxiliary device on the signal on the non-operating frequency band not to be controlled by the signal operation module 10. For example, signal strength of the signal on the non-operating frequency band after the signal is forwarded by the wireless auxiliary device is less than signal strength of the signal on the non-operating frequency band before being forwarded, that is, attenuation of the signal on the non-operating frequency band after the signal is forwarded by the wireless auxiliary device is greater than a preset attenuation threshold. Alternatively, a signal electromagnetic characteristic of the signal on the non-operating frequency band after the signal is forwarded by the wireless auxiliary device corresponding to different electromagnetic characteristics of the signal operation module 10 approximately remains unchanged, that is, a difference between electromagnetic characteristics of the forwarded signal on the non-operating frequency band is less than a difference threshold. For example, the wireless auxiliary devices corresponding to different electromagnetic characteristics mentioned herein are a first electromagnetic characteristic when all four switch components 101 shown in FIG. 2 are closed and a second electromagnetic characteristic when all the four switch components 101 are open, and the first electromagnetic characteristic and the second electromagnetic characteristic are different. It should be understood that only two states of the switch component are described herein. In an actual device, the switch component may have more than two states. The filtering module in this embodiment is configured to enable the electromagnetic response characteristic of the wireless auxiliary device on the signal on the non-operating frequency band not to be controlled by the signal operation module 10, so that channel information of another communication system operating on the non-operating frequency band is not affected by the wireless auxiliary device, and communication performance of the another communication system is not affected.

Optionally, there is a frequency band transition interval between the operating frequency band and the non-operating frequency band, and bandwidth of the frequency band transition interval is less than a preset bandwidth threshold, for example, does not exceed 20% of operating bandwidth.

The non-operating frequency band mentioned in this embodiment of the specification may be an adjacent frequency band of the operating frequency band. For example, the operating frequency band is 5 GHz to 6 GHZ, and the non-operating frequency band is 4 GHz to 5 GHz.

In an embodiment, the filtering module may be a switch component 101 shown in FIG. 2 and FIG. 3. The switch component 101 may be a PIN diode, a radio frequency switch, or the like, and has a specific frequency response characteristic. The frequency response characteristic is specifically described in detail in the following embodiments.

Figure 4:
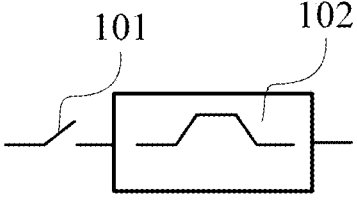
FIG. 4 is a schematic diagram of a parallel structure of a switch component and a band-pass filter according to an embodiment of this application.

In another embodiment, the filtering module may be a band-pass filter 102 shown in FIG. 4. The band-pass filter 102 is connected to the switch component 101 in series, and two ends after the band-pass filter 102 is connected to the switch component 101 in series are separately connected to two signal operation modules 10. For details, reference may be made to a location of the switch component 101 in FIG. 2. Alternatively, the filtering module may be a band-stop filter 102 shown in FIG. 5. The band-stop filter 102 is connected to the switch component 101 in parallel, and two ends of a structure formed after the band-stop filter 102 is connected to the switch component 101 in parallel are separately connected to two signal operation modules 10. For details, reference may be made to a location of the switch component 101 in FIG. 2. It should be understood that, in actual implementation, the band-pass filter 102 may be a filter formed by multiple physical components, may be a filter module obtained by cascading/connecting multiple filters in parallel, and may be a filter module having multiple pass bands.

Figure 6:
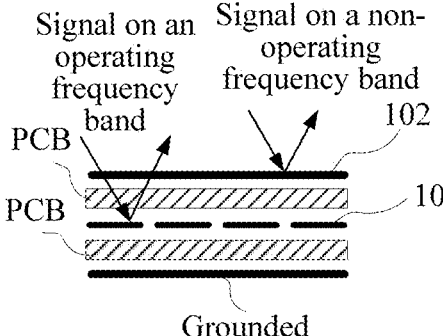
FIG. 6 is a schematic diagram of a partial structure of a wireless auxiliary device according to another embodiment of this application.

In still another embodiment, as shown in FIG. 6, the filtering module 102 covers an outer surface of the signal operation module 10, the signal on the non-operating frequency band is reflected (as shown by a dotted arrow in FIG. 6) or absorbed by the filtering module 102, and the signal on the operating frequency band can be radiated through the filtering module 102 onto the signal operation module 10 (as shown by a solid arrow in FIG. 6). Optionally, the filtering module 102 may be a frequency selected surface (FSS). It should be understood that, in actual implementation, the filtering module 102 may be a filtering module formed after multiple filtering layers are stacked, and filtering characteristics of the filtering layers may be the same or different. A printed circuit board (PCB) shown in FIG. 6 corresponds to a combination of the medium layer 20 and the bottom plate 30 in another embodiment.

Figure 7:
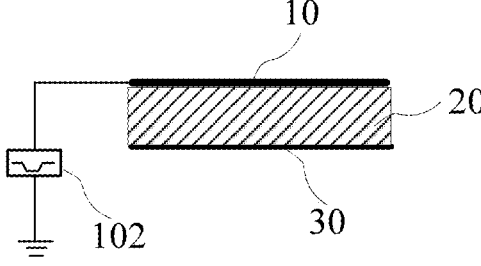
FIG. 7 is a schematic diagram of a partial structure of a wireless auxiliary device according to still another embodiment of this application.

In still another embodiment, as shown in FIG. 7, one end of the filtering module 102 is connected to the signal operation module 10, and the other end of the filtering module 102 is connected to a reference ground. In another embodiment, one end of the filtering module 102 is connected to the signal operation module 10, and the other end of the filtering module 102 is connected to a power module (not shown) of the wireless auxiliary device. In this embodiment, each signal operation module 10 may be connected to one filtering module 102. On the operating frequency band, the filtering module 102 meets a blocking characteristic, and on the non-operating frequency band, the filtering module 102 meets a conduction characteristic. Optionally, the filtering module 102 in this embodiment may be a surface acoustic wave (SAW) filter, a BAW filter, or the like.

The wireless auxiliary device provided in the embodiments of this application includes a signal operation module and a filtering module. An electromagnetic characteristic of the signal operation module is adjusted, so that an electromagnetic response characteristic of the signal on the operating frequency band can be controlled. In addition, the filtering module enables an electromagnetic response characteristic of the wireless auxiliary device on a signal on a non-operating frequency band not to be controlled by the signal operation module. Therefore, the wireless auxiliary device does not affect the signal on the non-operating frequency band, to reduce communication interference to an adjacent-frequency communication system.

To describe in detail the wireless auxiliary device provided in the embodiments of this application, the following describes the wireless auxiliary device with reference to several specific embodiments.

EMBODIMENT 1

In this embodiment, a control element/module (such as the switch component 101) of the signal operation module 10 has a specific frequency selection characteristic, to achieve an objective of not affecting an adjacent-frequency system.

The specific frequency selection characteristic mentioned herein may be as follows: When different control signals are loaded to the control element/module, a difference between frequency response characteristics (amplitude-frequency and phase-frequency response characteristics) of the control element/module on the operating frequency band is greater than a required first specified threshold, a difference between frequency response characteristics on an adjacent frequency is less than a required second specified threshold, and the first specified threshold and the second specified threshold are generally different.

For example, the different control signals mentioned herein include a control signal that controls the switch component 101 to be opened and a control signal that controls the switch component 101 to be closed in FIG. 2. Certainly, in another embodiment, there may be more types of control signals.

An implementation of the foregoing control element/module may be a parallel or serial filter of a controllable component (a switch module or a variable state component such as a voltage controlled varactor), or a customized controllable component that meets the foregoing requirement, or a module that composes the foregoing characteristic by using multiple analog components.

As shown in FIG. 2, the wireless auxiliary device mentioned in this embodiment includes at least the following structure: the signal operation module 10 that is also referred to as a signal receiving/radiation unit, the switch component 101 that includes the foregoing controllable component and a corresponding control circuit module and may further include an additional filtering component, or an underlying substrate corresponding to a combination of the medium layer 20 and the bottom plate 30 in the embodiment shown in FIG. 2.

Embodiment 1 are described below by using three implementations.

Implementation 1

Figure 5:
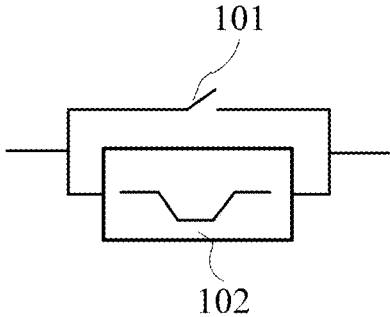
FIG. 5 is a schematic diagram of a serial structure of a switch component and a band-stop filter according to an embodiment of this application.

With reference to FIG. 2 and FIG. 5, in this embodiment, the switch component 101 in FIG. 2 may be replaced with a parallel structure of the switch component 101 and the filtering module 102 (that is, a band-stop filter) shown in FIG. 5. In this embodiment, an overall electromagnetic/circuit characteristic of the parallel structure between the switch component 101 and the filtering module 102 meets an expected frequency selection characteristic.

The signal operation module 10 in this embodiment includes the switch component 101. The switch component 101 has two operating states: an on state and an off state. The switch component 101 is configured to adjust the electromagnetic characteristic of the signal operation module 10. The switch component 101 is connected to the filtering module 102 in parallel. The filtering module 102 has a band-stop filtering characteristic. Alternatively, a whole of the switch component 101 that is connected in parallel to the filtering module 102 meets a first characteristic and a second characteristic described in the following Implementation 3.

In an example, the filtering module 102 on the operating frequency band meets the blocking characteristic, and the blocking characteristic includes: a transmission parameter (for example, a parameter S21) of the filtering module 102 for the signal on the operating frequency band is less than a first threshold, and the first threshold may be a value close to 0. The filtering module 102 on the non-operating frequency band meets the conduction characteristic, and the conduction characteristic includes: a transmission parameter (for example, a parameter S21) of the filtering module 102 for the signal on the non-operating frequency band is greater than a second threshold, and the second threshold may be a value close to 1. The second threshold is greater than the first threshold.

Figure 8:
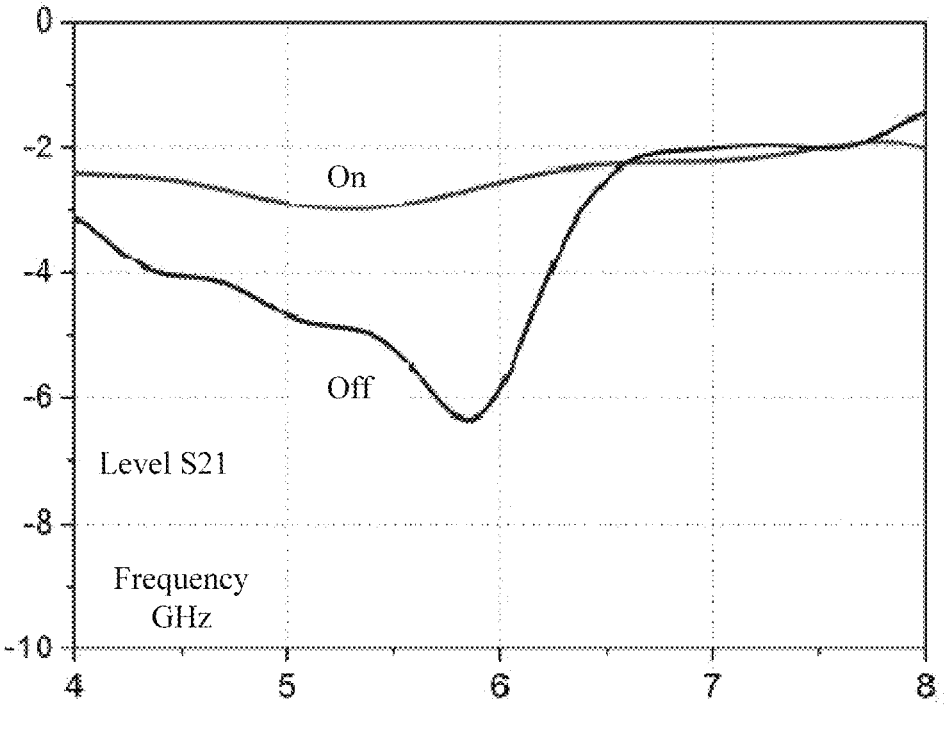
FIG. 8 is a schematic diagram of a transmission parameter of a switch component according to an embodiment of this application.

In another embodiment, the transmission characteristic of the filtering module 102 is compensated and designed according to the frequency response characteristic of the switch component 101, so that the frequency response characteristic of the switch component 101 and the filtering module 102 that are connected in parallel meets a component design requirement of blocking/conduction. For example, as shown in FIG. 8, a horizontal coordinate in FIG. 8 represents a frequency, and a unit may be GHz, and a vertical coordinate may be a parameter S21 (or level). A curve on an upper side in FIG. 8 is a transmission parameter curve when the switch component is enabled, and a curve on a lower side in FIG. 8 is a transmission parameter curve when the switch component is disabled. An operating frequency band in the example shown in FIG. 8 may be approximately 5.8 GHz. A part less than 5.5 GHz of the curve on the lower side is compensated, so that a part of the curve obtained after compensation is overlapped with a transmission parameter curve obtained when the switch component is enabled as much as possible.

Optionally, there is a frequency band transition interval between the operating frequency band and the non-operating frequency band. In the frequency band transition interval, the filtering module 102 is located between the blocking characteristic and the conduction characteristic. Bandwidth of the frequency band transition interval is less than a preset bandwidth threshold, for example, does not exceed 20% of operating bandwidth.

Implementation 2

With reference to FIG. 2 and FIG. 4, in this embodiment, the switch component 101 in FIG. 2 may be replaced with a serial structure of the switch component 101 and the filtering module 102 (that is, a band-pass filter) shown in FIG. 4. In this embodiment, an overall electromagnetic/circuit characteristic of the serial structure between the switch component 101 and the filtering module 102 meets an expected frequency selection characteristic.

The signal operation module 10 in this embodiment includes the switch component 101. The switch component 101 has two operating states: an on state and an off state. The switch component 101 is configured to adjust the electromagnetic characteristic of the signal operation module 10. The switch component 101 is connected to the filtering module 102 in series. The filtering module 102 has a band-pass filtering characteristic. Alternatively, a whole of the switch component 101 that is connected in series to the filtering module 102 meets a first characteristic and a second characteristic described in the following Implementation 3.

In an example, the filtering module 102 on the operating frequency band meets the conduction characteristic, and the conduction characteristic includes: a transmission parameter (for example, a parameter S21) of the filtering module 102 for the signal on the operating frequency band is greater than a third threshold, and the third threshold may be a value close to 1. The filtering module 102 on the non-operating frequency band meets the blocking characteristic, and the blocking characteristic includes: a transmission parameter (for example, a parameter S21) of the filtering module 102 for the signal on the non-operating frequency band is less than a fourth threshold, and the fourth threshold may be a value close to 0. The third threshold is greater than the fourth threshold.

In another embodiment, the transmission characteristic of the filtering module 102 is compensated and designed according to the frequency response characteristic of the switch component 101, so that the frequency response characteristic of the switch component 101 and the filtering module 102 that are connected in parallel meets a component design requirement of blocking/conduction. For details, reference may be made to description in Implementation 1.

Optionally, there is a frequency band transition interval between the operating frequency band and the non-operating frequency band. In the frequency band transition interval, the filtering module 102 is located between the blocking characteristic and the conduction characteristic. Bandwidth of the frequency band transition interval is less than a preset bandwidth threshold, for example, does not exceed 20% of operating bandwidth.

Implementation 3

For this embodiment, reference may be made to FIG. 2. The filtering module in this embodiment is the switch component 101. The switch component 101 with a specific indicator is customized. The switch component 101 may be a PIN diode, a radio frequency switch, or the like, and has a specific frequency response characteristic. Optionally, the switch component 101 has two operating states: an on state and an off state, and the switch component 101 is configured to adjust the electromagnetic characteristic of the signal operation module.

In this embodiment, the switch component 101 band meets a first characteristic on the operating frequency, and the first characteristic includes: when different control signals are loaded on the switch component 101, a difference between transmission parameters (for example, parameters S21) of the switch component 101 for the signal on the operating frequency band is greater than a fifth threshold. The switch component 101 meets a second characteristic on the non-operating frequency band, and the second characteristic includes: when different control signals are loaded on the switch component 101, a difference between transmission parameters (for example, parameters S21) of the switch component 101 for the signal on the non-operating frequency band is less than a sixth threshold. The different control signals are separately used to control two operating states of the switch component, and the fifth threshold is greater than the sixth threshold.

For example, the different control signals mentioned herein include a control signal that controls the switch component 101 to be opened and a control signal that controls the switch component 101 to be closed in FIG. 2. Certainly, in another embodiment, there may be more types of control signals.

Optionally, there is a frequency band transition interval between the operating frequency band and the non-operating frequency band. In the frequency band transition interval, the filtering module 102 is located between the blocking characteristic and the conduction characteristic. Bandwidth of the frequency band transition interval is less than a preset bandwidth threshold, for example, does not exceed 20% of operating bandwidth.

EMBODIMENT 2

As shown in FIG. 6, in this embodiment, a frequency selected surface (FSS) is covered on the wireless auxiliary device. Signals outside the operating frequency band are shielded or absorbed by the FSS. Only signals on the operating frequency band can be radiated through the FSS to the signal operation module 10.

The FSS consists of a large number of regularly distributed FSS units. Optionally, a size of the FSS unit is the same as a size of the signal operation module 10 of the wireless auxiliary device, and the FSS units are superposed on the signal operation module 10 in a one-to-one correspondence.

In this embodiment, an FSS component may be equivalent to a two-port component. It is assumed that a plane facing external space is a port 1, and a surface that is of the signal operation module 10 and that faces a lower layer of the component is a port 2. Referring to FIG. 6, a surface of the filtering module 102 facing the signal operation module 10 is a port 1, and a surface of the filtering module 102 facing the signal operation module 10 is a port 2. Based on the foregoing assumption, characteristics of the FSS component may be determined by using transmission parameters s11, s12, s21, and s22.

Implementation 1

Signals outside the operating frequency band are absorbed by the FSS module. Signals on the operating frequency band may be radiated through the FSS to the signal operation module 10 at a very low loss. In terms of transmission parameters, for the operating frequency band, s12 and s21 of the FSS module need to be greater than a seventh threshold and close to 1, indicating that a loss of the operating frequency band is small enough, and s11 and s22 need to be less than an eighth threshold and close to 0. For frequencies outside the operating frequency band, s11, s12, s21, and s22 of the FSS module operating less than a ninth threshold and close to 0, indicating that the signal is absorbed by the FSS.

Implementation 2

Signals outside the operating frequency band are reflected by the FSS module. Signals on the operating frequency band can be radiated through the FSS to an intelligent surface at a very low loss. In terms of transmission parameters, for the operating frequency band, s12 and s21 of the FSS module need to be greater than a tenth threshold and close to 1, indicating that a loss of the operating frequency band is small enough, and s11 and s22 need to be less than an eleventh threshold and close to 0. On the non-operating frequency band, s21 and s12 of the FSS module need to be less than a twelfth threshold and close to 0, and s11 and s22 need to be greater than a thirteenth threshold, indicating that the signal is directly reflected by the FSS.

For a transmissive wireless auxiliary device, an FSS module needs to be integrated in a more diversified manner, for example, an FSS is mounted before incidence, or an FSS is mounted before exit, or both are considered.

EMBODIMENT 3

As shown in FIG. 7, in this embodiment, the filtering module 102 is added to a power/ground module of the wireless auxiliary device, so that signal radiation outside the operating frequency band cannot form an effective electromagnetic response. The filtering module 102 may be a band-stop filter.

In this embodiment, one end of the filtering module 102 is connected to the signal operation module 10, and the other end of the filtering module 102 is connected to a reference ground or a power module. Optionally, each signal operation module 10 is separately grounded or connected to a power supply module, so that coupling between units can be avoided, and filtering efficiency of the filtering module 102 can be improved.

When a specific frequency signal is radiated to the signal operation module 10, an electromagnetic signal generates an electromagnetic induction signal of a corresponding frequency on the signal operation module 10. A component, that is, the filtering module 102 is added to each signal operation module 10, and is grounded or connected to a power circuit. The filtering module 102 has a band-stop characteristic, has a good band-stop characteristic on the operating frequency band, and has a band-pass characteristic on the non-operating frequency band, so that an induced signal outside the operating frequency band is approximately grounded, and therefore an effective exit signal cannot be formed.

Figure 9:
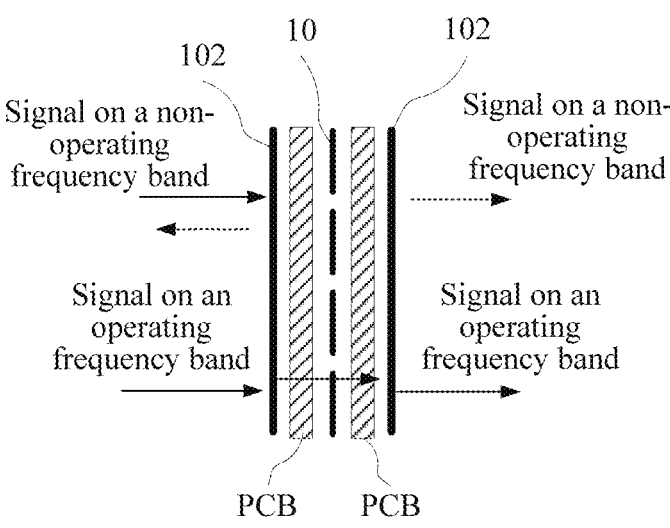
FIG. 9 is a schematic diagram of a partial structure of a wireless auxiliary device according to yet another embodiment of this application.

The embodiments of this specification are mainly described by using a reflective wireless auxiliary device as an example. FIG. 9 is a schematic diagram of a structure of a transmissive wireless auxiliary device. The transmissive wireless auxiliary device mainly includes a signal operation module 10, a filtering module 102, and a printed circuit board (PCB). The PCB corresponds to a combination of a medium layer 20 and a bottom plate 30 in another embodiment.

The filtering module 102 in this embodiment may be a frequency selected surface (FSS). A layer of FSS is covered on both surfaces of the wireless auxiliary device. Signals outside an operating frequency band are partially reflected or partially absorbed by the FSS. Signals on the operating frequency band can be radiated through the FSS to the signal operation module 10 and transmitted out through the wireless auxiliary device.

It should be noted that the wireless auxiliary device mentioned in each embodiment of this specification may be e a large intelligent surface (LIS). The LIS may dynamically/semi-statically adjust an electromagnetic characteristic of the LIS, and control an electromagnetic response characteristic of a signal on the operating frequency band by adjusting an electromagnetic characteristic of a signal operation module of the LIS. For example, the LIS may control a reflection wave/refraction signal of the signal on the operating frequency band, to implement functions such as beam scanning/beamforming.

For a working principle of the wireless auxiliary device mentioned in the embodiments of this specification, a wireless auxiliary device that controls a phase of a reflected signal is used as an example. A group of signal operation modules shown in FIG. 2 includes four square metal units (that is, signal operation modules). When the four square metal units are disconnected (that is, all the four switch components shown in FIG. 2 are switched off), a phase difference between a reflected signal and an incident signal of a signal of 39 GHz is approximately-50 degrees. When the four square metal units are connected to each other (that is, all the four switch components shown in FIG. 2 are connected to each other), a phase difference between the reflected signal and the incident signal of the signal of 39 GHz is approximately 130 degrees. On and off states of the four square metal units correspond to two operating states of the wireless auxiliary device, and may be controlled by using an on/off state of a switch component such as a PIN diode. In other words, two PIN diode states (an on state and an off state) of the signal operation module of the wireless auxiliary device correspond to different phase frequency response characteristics. On a 39 GHz frequency band, a phase frequency response difference of the two PIN diode states is 180 degrees. By using this phase-frequency difference, the wireless auxiliary device may control an electromagnetic signal of an operating frequency band (for example, 39 GHz), for example, control a state of a reflected signal of each signal operation module purposefully, so that the reflected signal of the signal operation module implements signal phase forward superposition or phase reverse cancellation at a specific direction or a specific position.

For another type of wireless auxiliary device, such as a transmissive wireless auxiliary device and an amplitude control type wireless auxiliary device, a signal operation principle and a signal operation module principle are slightly different from a reflective wireless auxiliary device, and state switching of the signal operation module may be implemented by using a controllable component (such as a switch component).

In the descriptions of this specification, reference to the descriptions of the term "one embodiment", "some embodiments", "schematic embodiments", "examples", "specific examples", or "some examples" means that specific features, structures, materials, or features described with reference to this embodiment or example are included in at least one embodiment or example of this application. In this specification, schematic descriptions of the foregoing term do not necessarily refer to a same embodiment or example. Furthermore, specific features, structures, materials, or features that are described may be incorporated in an appropriate manner in any one or more embodiments or examples.

Although the embodiments of this application have been shown and described, a person of ordinary skill in the art may understand that, without departing from the principle and purpose of this application, various changes, modifications, replacements, and variations may be made to these embodiments, and the scope of this application is limited by claims and equivalents thereof.

What is claimed is:

1. A wireless auxiliary device, comprising a signal operation module and a filtering module, wherein an electromagnetic characteristic of the signal operation module is adjustable, and an electromagnetic response characteristic of a signal on an operating frequency band is controlled by adjusting the electromagnetic characteristic of the signal operation module;

the filtering module is configured to enable an electromagnetic response characteristic of the wireless auxiliary device on a signal on a non-operating frequency band not to be controlled by the signal operation module; wherein the non-operating frequency band is an adjacent frequency band of the operating frequency band, there is a frequency band transition interval between the operating frequency band and the non-operating frequency band, and bandwidth of the frequency band transition interval is less than a preset bandwidth threshold; and the signal on the operating frequency band and the signal on the non-operating frequency band are radio signals transmitted by a base station or a terminal; wherein the wireless auxiliary device comprises a switch component, the switch component has two operating states: an on state and an off state, the switch component is configured to adjust the electromagnetic characteristic of the signal operation module, the signal operation module has a frequency selection characteristic, the frequency selection characteristic is related to a connection structure between the switch component and the filtering module, and a transmission characteristic of the filtering module is determined according to a frequency response characteristic of the signal operation module.

2. The wireless auxiliary device according to claim 1, wherein electromagnetic response characteristics of the signal on the operating frequency band that the wireless auxiliary device is configured to control comprise at least one of: a phase, an amplitude, or a polarization direction.

3. The wireless auxiliary device according to claim 1, wherein signal strength of the signal on the non-operating frequency band after being forwarded by the wireless auxiliary device is less than signal strength of the signal on the non-operating frequency band before being forwarded; or a signal electromagnetic characteristic of the signal on the non-operating frequency band remains unchanged after being forwarded by the wireless auxiliary device corresponding to different electromagnetic characteristics of the signal operation module.

4. The wireless auxiliary device according to claim 1, wherein there is a frequency band transition interval between the operating frequency band and the non-operating frequency band, and bandwidth of the frequency band transition interval is less than a preset bandwidth threshold.

5. The wireless auxiliary device according to claim 1, wherein the wireless auxiliary device further comprises a medium layer and a bottom plate, the bottom plate is adhered to a first side of the medium layer, and the signal operation module is adhered to a second side of the medium layer.

6. The wireless auxiliary device according to claim 5, wherein there are multiple signal operation modules, and the multiple signal operation modules are disposed in an array on the medium layer.

7. The wireless auxiliary device according to claim 1, wherein the signal operation module comprises the switch component, the switch component is connected in parallel to the filtering module, and the filtering module has a band-stop filtering characteristic.

8. The wireless auxiliary device according to claim 7, wherein the filtering module meets a blocking characteristic on the operating frequency band, and the blocking characteristic comprises: a transmission parameter of the filtering module for the signal on the operating frequency band is less than a first threshold; and the filtering module meets a conduction characteristic on the non-operating frequency band, and the conduction characteristic comprises: a transmission parameter of the filtering module for the signal on the non-operating frequency band is greater than a second threshold; wherein the second threshold is greater than the first threshold.

9. The wireless auxiliary device according to claim 1, wherein the signal operation module comprises the switch component, the switch component is connected in series to the filtering module, and the filtering module has a band-pass filtering characteristic.

10. The wireless auxiliary device according to claim 9, wherein the filtering module meets a conduction characteristic on the operating frequency band, and the conduction characteristic comprises: a transmission parameter of the filtering module for the signal on the operating frequency band is greater than a third threshold; and the filtering module meets a blocking characteristic on the non-operating frequency band, and the blocking characteristic comprises: a transmission parameter of the filtering module for the signal on the non-operating frequency band is less than a fourth threshold; wherein the third threshold is greater than the fourth threshold.

11. The wireless auxiliary device according to claim 1, wherein the filtering module comprises the switch component.

12. The wireless auxiliary device according to claim 11, wherein the switch component meets a first characteristic on the operating frequency band, and the first characteristic comprises: when different control signals are loaded on the switch component, a difference between transmission parameters of the switch component for signals on the operating frequency band is greater than a fifth threshold; and the switch component meets a second characteristic on the non-operating frequency band, and the second characteristic comprises: when different control signals are loaded on the switch component, a difference between transmission parameters of the switch component for signals on the non-operating frequency band is less than a sixth threshold; wherein the different control signals are separately used to control two operating states of the switch component, and the fifth threshold is greater than the sixth threshold.

13. The wireless auxiliary device according to claim 1, wherein the filtering module covers a surface of the signal operation module.

14. The wireless auxiliary device according to claim 13, wherein the signal on the non-operating frequency band is absorbed by the filtering module; wherein on the operating frequency band, a transmission parameter s12 and a transmission parameter s21 of the filtering module are greater than a seventh threshold, and a transmission parameter s11 and a transmission parameter s22 are less than an eighth threshold; and on the non-operating frequency band, a transmission parameter s11, a transmission parameter s12, a transmission parameter s21, and a transmission parameter s22 of the filtering module are all less than a ninth threshold; wherein the seventh threshold is greater than the eighth threshold and the ninth threshold, a surface of the filtering module away from the signal operation module is a port 1, and a surface of the filtering module facing the signal operation module is a port 2.

15. The wireless auxiliary device according to claim 13, wherein the signal on the non-operating frequency band is reflected by the filtering module; wherein on the operating frequency band, a transmission parameter s12 and a transmission parameter s21 of the filtering module are greater than a tenth threshold, and a transmission parameter s11 and a transmission parameter s22 are less than an eleventh threshold; and on the operating frequency band, a transmission parameter s12 and a transmission parameter s21 of the filtering module are less than a twelfth threshold, and a transmission parameter s11 and a transmission parameter s22 are greater than a thirteenth threshold; and the tenth threshold is greater than the eleventh threshold, the thirteenth threshold is greater than the twelfth threshold, a surface of the filtering module away from the signal operation module is a port 1, and a surface of the filtering module facing the signal operation module is a port 2.

16. The wireless auxiliary device according to claim 1, wherein one end of the filtering module is connected to the signal operation module, and other end of the filtering module is connected to a reference ground or a power module.

17. The wireless auxiliary device according to claim 16, wherein the filtering module meets a blocking characteristic on the operating frequency band, and the filtering module meets a conduction characteristic on the non-operating frequency band.

* * * * *